(12) United States Patent
Hidaka

(10) Patent No.: US 7,477,898 B2
(45) Date of Patent: Jan. 13, 2009

(54) HAND-OFF CONTROL METHOD AND WIRELESS COMMUNICATION APPARATUS USING THE METHOD

(75) Inventor: Hiroyuki Hidaka, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 186 days.

(21) Appl. No.: 10/974,239

(22) Filed: Oct. 27, 2004

(65) Prior Publication Data

US 2005/0096050 A1    May 5, 2005

(30) Foreign Application Priority Data

Oct. 29, 2003 (JP) ............................ P.2003-369164

(51) Int. Cl.
*H04Q 7/20* (2006.01)
(52) U.S. Cl. ..................... 455/436; 455/442; 455/439; 370/335
(58) Field of Classification Search ................. 455/436, 455/439, 442; 370/335
See application file for complete search history.

(56) References Cited

U.S. PATENT DOCUMENTS 5,483,664 A * 1/1996 Moritz et al. ............... 455/428
2004/0259547 A1 * 12/2004 Lau et al. .................... 455/436
2005/0073977 A1 * 4/2005 Vanghi et al. ............... 370/335

FOREIGN PATENT DOCUMENTS

JP    2002-300644    10/2002

* cited by examiner

*Primary Examiner*—Charles N Appiah
*Assistant Examiner*—Randy Peaches
(74) *Attorney, Agent, or Firm*—Hogan & Hartson LLP

(57) ABSTRACT

The 1× wireless processing section communicates with the 1× base station while the EV-DO wireless processing section performs processing for communicating with the EV-DO base station. The measurement section measures strength of signals received from a plurality of base stations including the EV-DO base station performing data communication. The decision section decides whether or not the hand-off is to be performed based on the strength of the received signals measured by the measurement section. The reporting section generates a signal serving as a trigger for starting the hand-off in the case where the decision section decided to perform the hand-off and then outputs the signal to the EV-DO base station through the EV-DO processing section.

8 Claims, 6 Drawing Sheets

FIG. 2
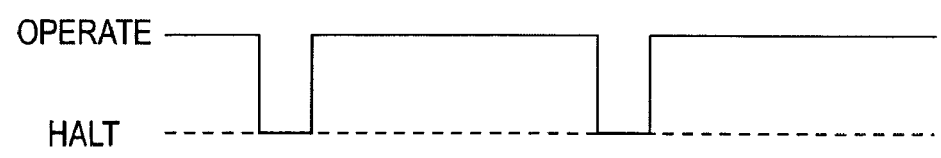
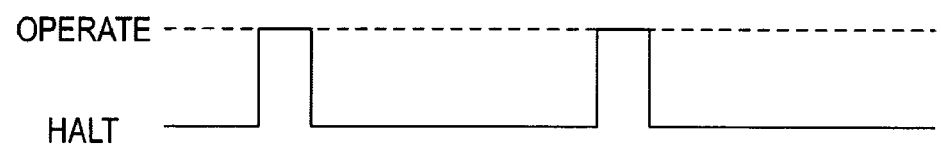

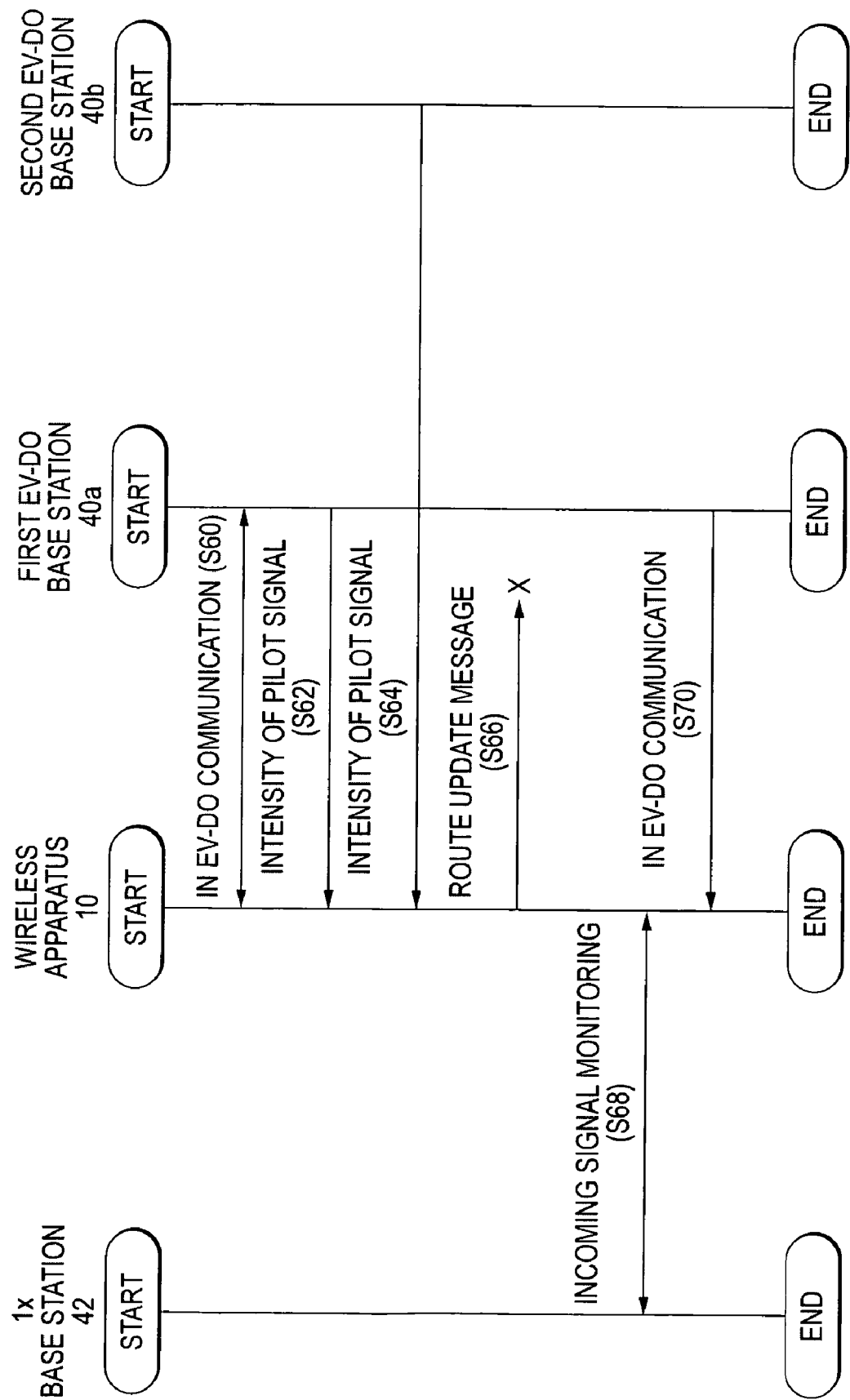

HAND-OFF CONTROL METHOD AND WIRELESS COMMUNICATION APPARATUS USING THE METHOD

BACKGROUND OF THE INVENTION

1. Field of the Invention

The invention relates to a hand-off control technique, particularly to a hand-off control method which is ready for a plurality of communication systems and a wireless communication apparatus using the method.

2. Description of the Related Art

Recently, cdma2000 1×EV-DO (hereinafter referred to as "EV-DO") has been developed as a next-generation high-rate radio communication system. The EV-DO is a version of specializing cdma2000 1× (hereinafter also referred to as "1×") provided by expanding cdma2000 to the third-generation system for data communications and increasing the transmission rate. "EV" means Evolution, and "DO" means Data Optimized.

The EV-DO system is approximately the same as the cdma2000 1× system in the configuration of a radio interface of a reverse channel from a radio communication terminal to a base station. As for the configuration of the radio interface of a forward channel from a base station to a radio communication terminal, whereas the bandwidth of 1.23 MHz is the same with that of the cdma2000 1× system, the modulation method and the multiplexing method are much different from those of the cdma2000 1× system. As for the modulation method, whereas QPSK and HPSK are used in the cdma2000 1× system, QPSK, 8-PSK, or 16QAM is selectively used in the EV-DO system according to a reception state of a forward channel of a radio communication terminal. As a result, a high transmission rate with low error correction capability is used when the reception state is good, and a low transmission rate with high error correction capability is used when the reception state is bad.

As for the multiplexing method for enabling multiple communications from one base station to a plurality of radio communication terminals, TDMA (Time Division Multiple Access) is employed in which communications with a plurality of radio communication terminals are performed in such a manner that time is divided in units of 1/600 second, a communication is performed with one radio communication terminal in each unit time, and the radio communication terminal to be communicated is switched every unit time, rather than CDMA (Code Division Multiple Access) which is employed in the cdmaOne system and the cdma2000 1× system.

A radio communication terminal measures a carrier-to-interference power ratio (hereinafter abbreviated as CIR) of a pilot signal as an index of a reception state of a forward channel from a base station to be communicated, predicts a reception state during the next reception time slot on the basis of a variation of the CIR, and notify "a maximum transmission rate which enables to receive with a error ratio that is lower than a predetermined rate", which is expected from the predicted reception state to the base station as data rate control bits (hereinafter referred to as DRC) predetermined. The predetermined error rate is usually set to about 1% though it depends on the system design. The base station receives the DRCs from a plurality of radio communication terminals, and a scheduler function in the base station determines with which radio communication terminal is to communicate in each division unit time. Basically, as high a transmission rate as possible is decided on the basis of a DRC sent from each radio communication terminal and is used for a communication with it.

With the above configuration, the EV-DO system enables a maximum transmission rate of 2.4 Mbps (mega-bits per second) per sector in a forward channel. This transmission rate is the sum of amounts of data communications from one base station to a plurality of radio communication terminals in one frequency band and in one of a plurality of sectors (usually, a plurality of sectors exist). The transmission rate increases if a plurality of frequency bands are used.

JP-A-2002-300644 is referred to as a related art.

If a wireless communication terminal uses an RF circuit and an antenna to be in conformity with both of the EV-DO system and the 1× system, the user does not have to carry two terminals for the EV-DO system and the 1× system, thereby improving convenience. Since the wireless communication terminal switches the RF circuit and the antenna according to the situation in order to be in conformity with the two communication systems, the wireless communication terminal can detect an incoming call of the 1× system during data communication of the EV-DO system. However, in the case where a hand-off of the EV-DO system occurs during data communication of the EV-DO system, and further an incoming call monitoring time of 1× system starts before completion of the hand-off processing of the EV-DO system, the wireless communication terminal halts the hand-off processing of the EV-DO system to execute the incoming call monitoring processing of the 1× system. As a result, a monitoring timer of the hand-off is terminated in the base station of the EV-DO system so that communication of the EV-DO system is cut off.

SUMMARY OF THE INVENTION

The object of the invention is to provide a hand-off control method capable of preventing failure of hand-off processing caused by incoming call monitoring processing executed by another communication system as well as to provide a wireless communication apparatus using the method.

The invention provides a wireless communication apparatus having: a first communication section that communicates with base stations of a first communication system capable of hand-off; a second communication section that intermittently communicates with a base station of a second communication system; a switching section that selects either one of the first communication section or the second communication section to be operated; a measurement section that measures strength of signals received from base stations with the first communication; a decision section that decides a candidate base station capable of hand-off based on the measured signal strength; and a reporting section that reports, by way of the first communication section, the decided candidate base station capable of hand-off to the base station in communication, wherein the reporting section cancels to report the decided candidate base station capable of hand-off based on a time difference between a timing of the intermittent communication of the control signal and a timing of the report of the candidate base station capable of hand-off.

The invention also provides a wireless communication apparatus having: a first communication section that communicates with base stations of a first communication system capable of hand-off; a second communication section that intermittently communicates with a base station of a second communication system; a switching section that selects either one of the first communication section and the second communication section to be operated; a measurement section that measures strength of signals received from base stations with the first communication section; a decision section that decides whether or not the hand-off is performed based on the strength of the measured signal; a signal generation section that generates a signal indicating the strength of the measured signal; and a control section that decides whether or not the first communication section transmits the signal generated by the signal generation section to the base station in communication based on a time difference between a current time and a nearest scheduled time on which the second communication section communicates with the base station of the second communication system.

Thus, the invention decides whether or not the signal generated by the signal generation section is to be transmitted according to the time difference between the current time and the nearest scheduled time on which the second communication section communicates with the base station of the second communication system. Therefore, it is possible to prevent failure of hand-off processing caused by the intermittent communication by the second communication section.

The wireless communication apparatus has: a first acquisition section that acquires the timing of the intermittent communication of the control signal; a timing generation section that generates a comparison timing acquired by shifting ahead the acquired timing by a period equal to or longer than a predetermined time length; and a second acquisition section that acquires the timing for the report of the candidate base station capable of hand-off, wherein the reporting section cancels to report the decided candidate base station capable of hand-off in the case where the generated comparison timing comes in advance of the acquired report timing. The control section permits to transmit the signal generated by the signal generation section if a time acquired by adding a predetermined period to the current time is on or before the scheduled time.

The timing generation section sets the shifting period of the acquired timing to a time length longer than a period from a reception by the base station in communication of the report of the decided candidate base station capable of hand-off to the decision by the base station in communication to hand off to the candidate base station. The predetermined time is longer than or equal to a period while the base station in communication receives the signal generated by the signal generation section and then decides to perform the hand-off.

The invention also a hand-off control method involving the steps of: executing an intermittent communication of a control signal with a second communication system in preference to a communication with a base station of a first communication system; and canceling, in a case where a timing acquired by shifting ahead a timing of the intermittent communication of the control signal to the base station of the second communication system by a period equal to or longer than a predetermined time length comes in advance of a timing of a report of a candidate base station capable of hand-off to the base station of the first communication system, the report of the candidate base station capable of hand-off to the base station of the first communication system.

The invention also a hand-off control method of a wireless communication apparatus having a first communication section that communicates with base stations of a first communication system capable of hand-off; and a second communication section that intermittently communicates with a base station of a second communication system, involving the steps of: measuring strength of signals received from a base station in communication with the first communication section and base stations other than the base station in communication; deciding whether or not the hand-off is performed based on the strength of the measured signal; generating a signal indicating the strength of the measured signal; and deciding whether or not the first communication section transmits the signal generated by the signal generation section to the base station in communication based on a time difference between a current time and a nearest scheduled time on which the second communication section communicates with the base station of the second communication system.

Note that arbitrary combinations of the above constituents as well as methods, devices, systems, recording mediums, and computer programs obtained by converting the wording of this invention are effective as embodiments of this invention.

Consequently, it is possible to provide the hand-off control method for preventing failure of the hand-off processing caused by incoming call monitoring processing executed by another communication system as well as to provide the wireless communication apparatus employing the method.

BRIEF DESCRIPTION OF THE DRAWINGS

FIG. 2 is a diagram showing operation timings of the EV-DO wireless processing section and the 1× wireless processing section of FIG. 1;

FIG. 6 is a diagram showing a sequence of hand-off processing of the wireless communication apparatus of FIG. 1.

DETAILED DESCRIPTION OF THE PREFERRED EMBODIMENTS

An embodiment relates to a wireless communication apparatus which is in conformity with both of the EV-DO system and the 1× system. In the embodiment, data communication is performed in the EV-DO system, but not in the 1× system. In the 1× system, the wireless communication apparatus accesses to a base station at regular intervals in order to wait for an incoming call from the base station. The wireless communication apparatus of the embodiment communicates with one base station of the EV-DO system and measures strength of a signal received from another base station to determine a base station to be subjected to hand-off. In the case where the base station to be handed off is found, the wireless communication apparatus outputs a predetermined control signal to the base station to start hand-off processing. However, if an access to the base station of the 1× system is made during the hand-off processing, there is a possibility that the hand-off processing is failed. In order to prevent such failure, the wireless communication apparatus acquires a predetermined time for the access to the base station of the 1× system. Even if the base station to be handed off has been found, the wireless communication apparatus does not start the hand-off processing when a period until the predetermined time is less than a predetermined threshold time.

Figure 1:
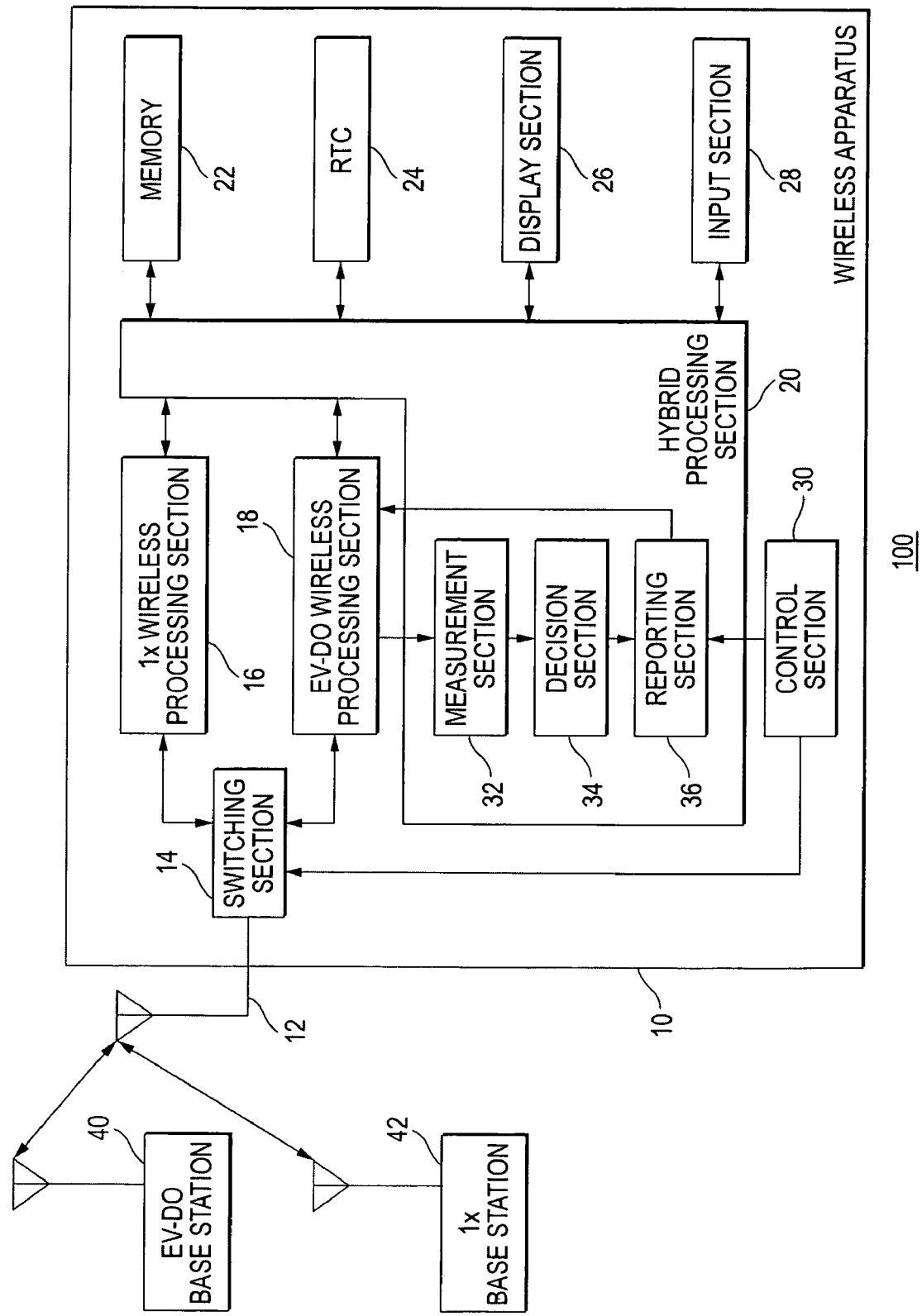
FIG. 1 is a diagram showing a configuration of a communication system according an embodiment of the invention.

FIG. 1 is a diagram showing a configuration of a communication system 100 according to the embodiment of the invention. The communication system 100 includes a wireless communication apparatus 10, an EV-DO base station 40, and a 1× base station 42. The wireless communication apparatus 10 includes an antenna 12, a switching section 14, a 1× wireless processing section 16, an EV-DO wireless processing section 18, a hybrid processing section 20, a memory 22, an RTC 24, a display section 26, an input section 28, and a control section 30. The hybrid processing section 20 includes a measurement section 32, a decision section 34, and a reporting section 36.

The EV-DO base station 40 is in conformity with the EV-DO system. The EV-DO base station 40 is connected to a network (not shown) to which another EV-DO base station 40 (not shown) is connected. The EV-DO base station 40 performs data communication with the wireless communication apparatus 10. The 1× base station 42 is in conformity with the 1× system. The 1× base station 42 is connected to the network (not shown like the EV-DO base stations 40). The 1× base station 42 does not perform communication with the wireless communication apparatus 10, and they monitor an incoming call at regular intervals.

The antenna 12 is provided for radio frequencies from the EV-DO base station 40 and the 1× base station 42. Although the antenna 12 is capable of communicating with both of the stations, the switching section 14 switches the antenna 12 at regular intervals. The switching section 14 includes an RF circuit such as a frequency converting circuit and an amplifying circuit.

The 1× wireless processing section 16 communicates with the 1× base station 42, and the EV-DO wireless processing section 18 communicates with the EV-DO base station 40. The 1× wireless processing section 16 and the EV-DO wireless processing section 18 performs communication processing such as modulation and demodulation processing and error correction processing. Though the 1× wireless processing section 16 does not currently perform data communication, it monitors an incoming call by accessing to the 1× base station 42 at regular intervals.

The hybrid processing section 20 performs processing on data for either one of the 1× wireless processing section 16 and the EV-DO wireless processing section 18 that is performing the data communication.

The measurement section 32 measures strength of signals received from a plurality of base stations including the EV-DO base station 40 which is currently performing the data communication. Since pilot signals are periodically transmitted from the EV-DO base stations in the EV-DO system, strength of the pilot signals received from the plurality of base stations are measured in the embodiment.

The decision section 34 decides whether or not the hand-off is performed based on the received signal strength measured by the measurement section 32. For instance, in the case where a received power from the EV-DO base station 40 currently in communication is below a predetermined threshold value while a received power from another base station exceeds the threshold value, the decision section 34 decides to perform the hand-off from the EV-DO base station 40 currently in communication to the another base station.

In the case where the decision section 34 decides to perform the hand-off, the reporting section 36 generates a signal serving as a trigger for starting the hand-off and outputs the signal to the EV-DO base station 40 through the EV-DO wireless processing section 18. The trigger signal "RouteUpdate Message" is used for reporting the strength of the pilot signal received by the wireless communication apparatus 10. The reporting section 36 does not output "RouteUpdate Message" immediately after the decision section 34 decides to perform the hand-off in order to prevent the failure of the hand-off processing due to the incoming signal monitoring processing by the 1× wireless processing section 16. The reporting section 36 acquires a current time "CurrentTime" from the RTC 24 and a time "NextTime" on which the 1× wireless processing section 16 accesses to the 1× base station 42 from the 1× wireless processing section 16. The reporting section 36 also acquires a predetermined guard period "Tguard" from the memory 22, and then outputs "RouteUpdate Message" in the case where the following condition is satisfied.

$$\text{CurrentTime} + T\text{guard} \leq \text{NextTime}$$

A time length of the predetermined guard period "Tguard" is set to be longer than or equal to a period while the EV-DO base station 40 receives "Route Update Message" from the wireless communication apparatus 10 and then decides the hand-off to another base station which is a candidate for the hand-off. That is, when the period from the current time to the predetermined time on which the 1× wireless processing section 16 accesses to the 1× base station 42 next time is shorter than the period required for the decision of the hand-off, "RouteUpdate Message" is not output. Thus, it is possible to prevent the failure of the hand-off processing.

The display section 26 is a display for displaying predetermined data. The input section 28 is a keyboard or the like used by a user for inputting predetermined processing.

The control section 30 performs various controls (for example, timing) of the wireless communication apparatus 10.

The above configuration is realized by a CPU, a memory, or another type of LSI of an arbitrary computer, and software of the configuration is realized by a program with a subscription management function, in which a memory is loaded. The configuration described herein includes functional blocks realized by the hardware and the software. Therefore, those skilled in the art will understand that each of the functional blocks takes various forms since it is possible to realize the functional block by the hardware, the software, or a combination of the hardware and the software.

FIG. 2 shows operation timings of the EV-DO wireless processing section 18 and the 1× wireless processing section 16. For brevity, it assumed that the EV-DO wireless processing section 18 does not perform the hand-off. Since the 1× wireless processing section 16 is not performing data communication, the 1× wireless processing section 16 is not in operation primarily. The 1× wireless processing section 16 will start operation at a timing of its access to the 1× base station 42 for monitoring an incoming call. Although the EV-DO wireless processing section 18 is in operation because the EV-DO wireless processing section 18 is performing data communication, the EV-DO wireless processing section 18 halts at the timing when the 1× wireless communication apparatus 16 accesses to the 1× base station 42. That is, in the case where the EV-DO wireless processing section 18 performs data communication while the 1× wireless processing section 16 monitors an incoming call without performing data communication, the EV-DO wireless processing section 18 and the 1× wireless processing section 16 operate alternately in such a manner that the 1× wireless processing section 16 operates at the timing of the incoming cal monitoring, so that either one of the EV-DO wireless processing section 18 or the 1× wireless processing section 16 is in operation.

Figure 3:
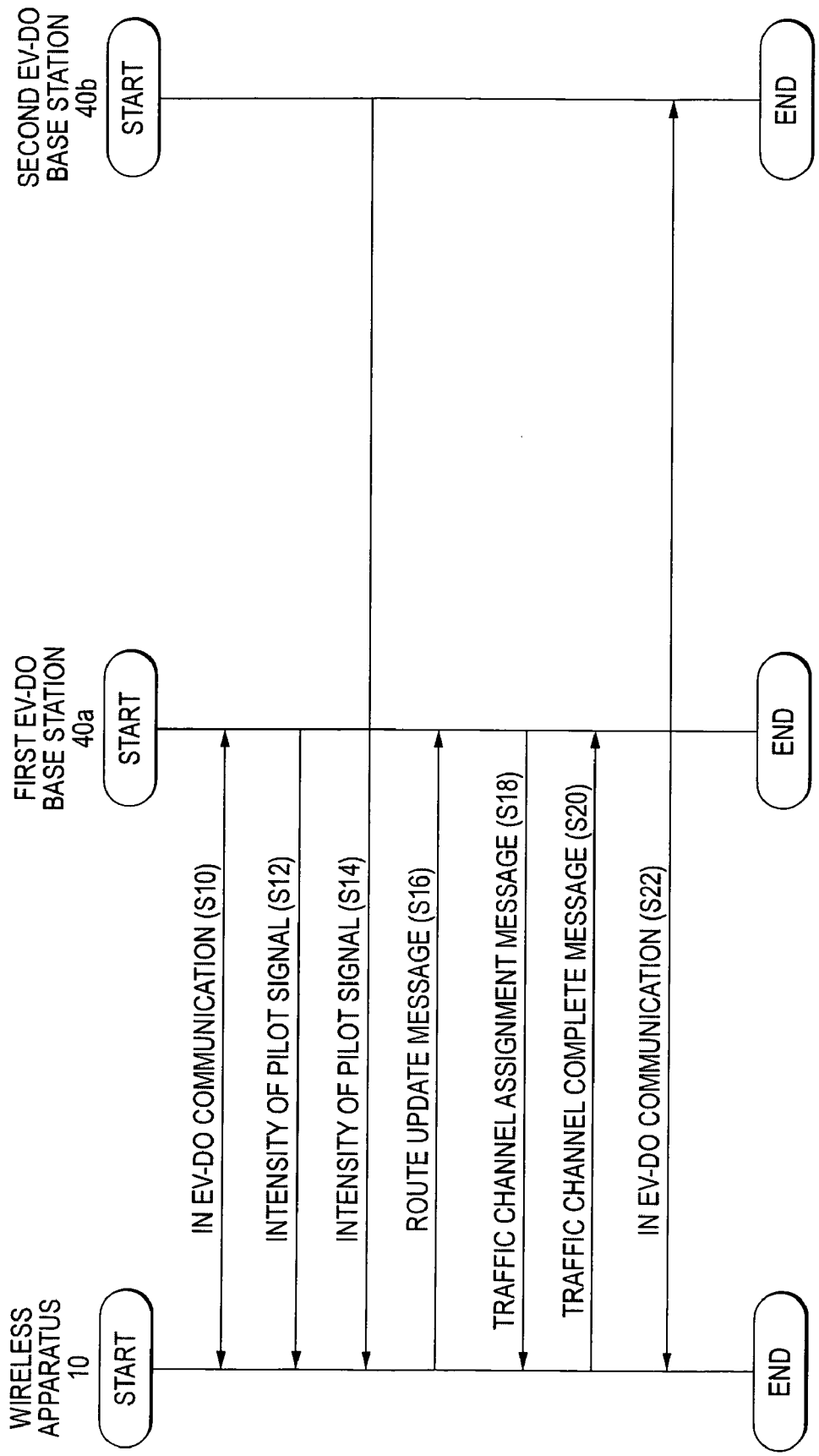
FIG. 3 is a diagram showing a sequence of hand-off processing during data communication in the 1×EV-DO system.

FIG. 3 is a diagram showing a sequence of hand-off processing during data communication in the 1×EV-DO system. For brevity, operation of the EV-DO wireless processing section 18 will be described in the following description while the description for the 1× wireless processing section 16 will be omitted. The EV-DO base station 40 which in communication with the wireless communication apparatus 10 of FIG. 1 is referrer to as a first EV-DO base station 40a, and the EV-DO base station 40 which is not shown in FIG. 1 is referred to as a second EV-DO base station 40b. The wireless communication apparatus 10 and the first EV-DO base station 40a communicate with each other under the EV-DO system (S10). The measurement section 32 measures strength of a pilot signal sent from the first EV-DO base station 40a (S12). The measurement section 32 also measures strength of a pilot signal sent from the second EV-DO base station 40b (S14). The decision section 34 decides whether or not hand-off from the first EV-DO base station 40a to the second EV-DO base station 40b is to be performed based on the measurement results. The wireless communication apparatus 10 transmits "RouteUpdate Message" to the first EV-DO base station 40a (S16). The first EV-DO base station 40a transmits "Traffic Channel Assignment Message" to the wireless communication apparatus 10 in response (S18). The massage "Traffic Channel Assignment Message" is a signal indicating a channel for accessing to the second EV-DO base station 40b. Further, the wireless communication apparatus 10 transmits "Traffic Channel Complete Message" to the first EV-DO base station 40a (S20). The "Traffic Channel Complete Message" is used for reporting the hand-off is completed. As a result, when data to be communicated are generated, the wireless communication apparatus 10 and the second EV-DO base station 40b communicate with each other under the EV-Do system (S22).

Figure 4:
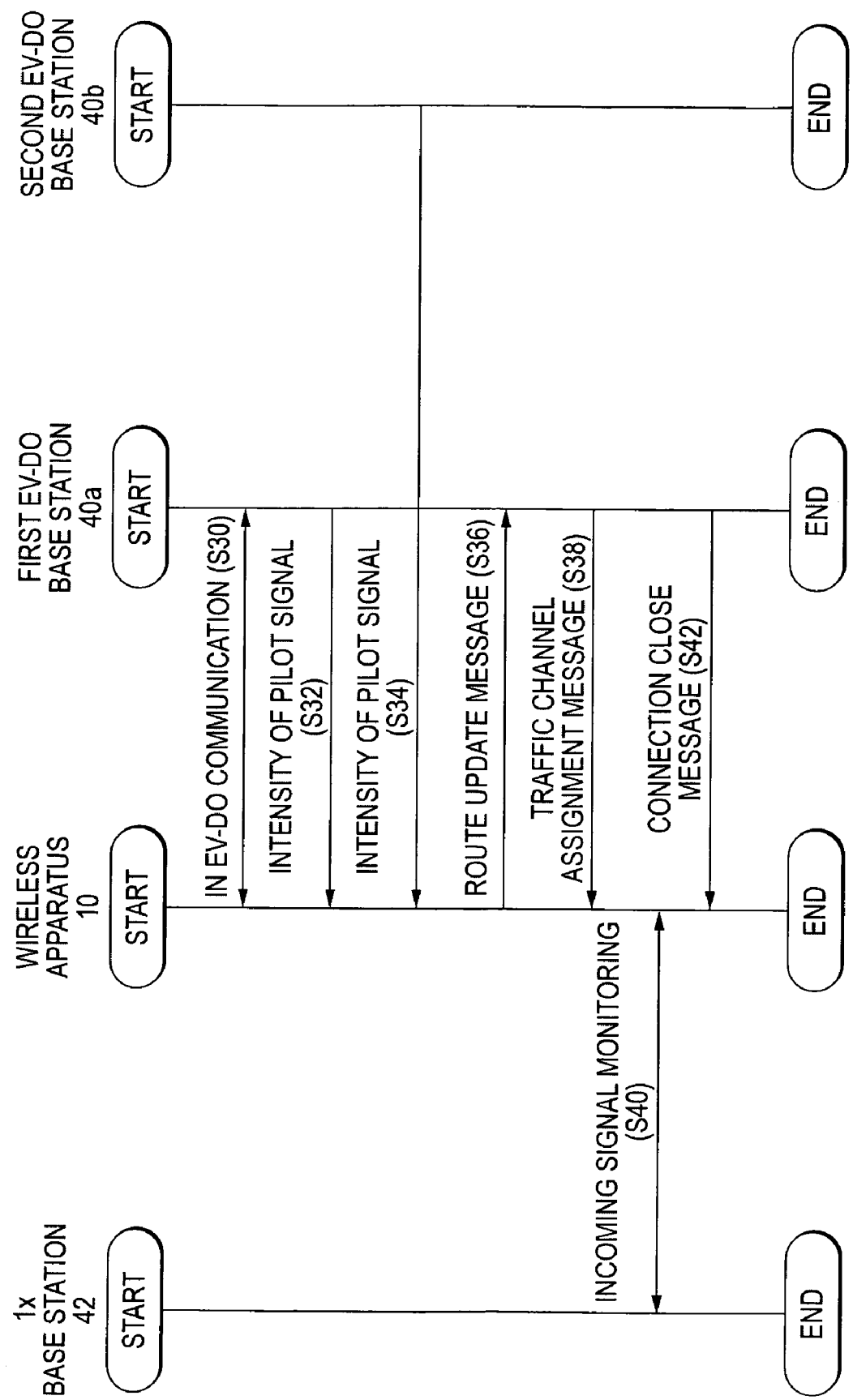
FIG. 4 is a diagram showing a sequence of failure of the hand-off processing.

FIG. 4 is a diagram showing a sequence of failure of the hand-off processing. The wireless communication apparatus 10 does not perform the above-described processing of the reporting section 36 and outputs "Route Update Message" immediately after the decision section 34 decides to perform the hand-off. The wireless communication apparatus 10 and the first EV-DO base station 40a communicate with each other under the EV-DO system (S30). The measurement section 32 measures strength of a pilot signal sent from the first EV-DO base station 40a (S32). The measurement section 32 also measures strength of a pilot signal sent from the second EV-DO base station 40b (S34). The decision section 34 decides whether or not hand-off from the first EV-DO base station 40a to the second EV-DO base station 40b is to be performed based on the measurement results. The wireless communication apparatus 10 transmits "RouteUpdate Message" to the first EV-DO base station 40a (S36). The first EV-DO base station 40a transmits "Traffic Channel Assignment Message" to the wireless communication apparatus 10 in response (S38). The wireless communication apparatus 10 communicates with the 1× base station 42 for monitoring an incoming call (S40). As a result, when the time set for processing between the wireless communication apparatus 10 and the first EV-DO base station 40a is over, the first EV-DO base station 40a outputs "Connection Close Message" to the wireless communication apparatus 10 (S42), whereby the line is cut off.

Figure 5:
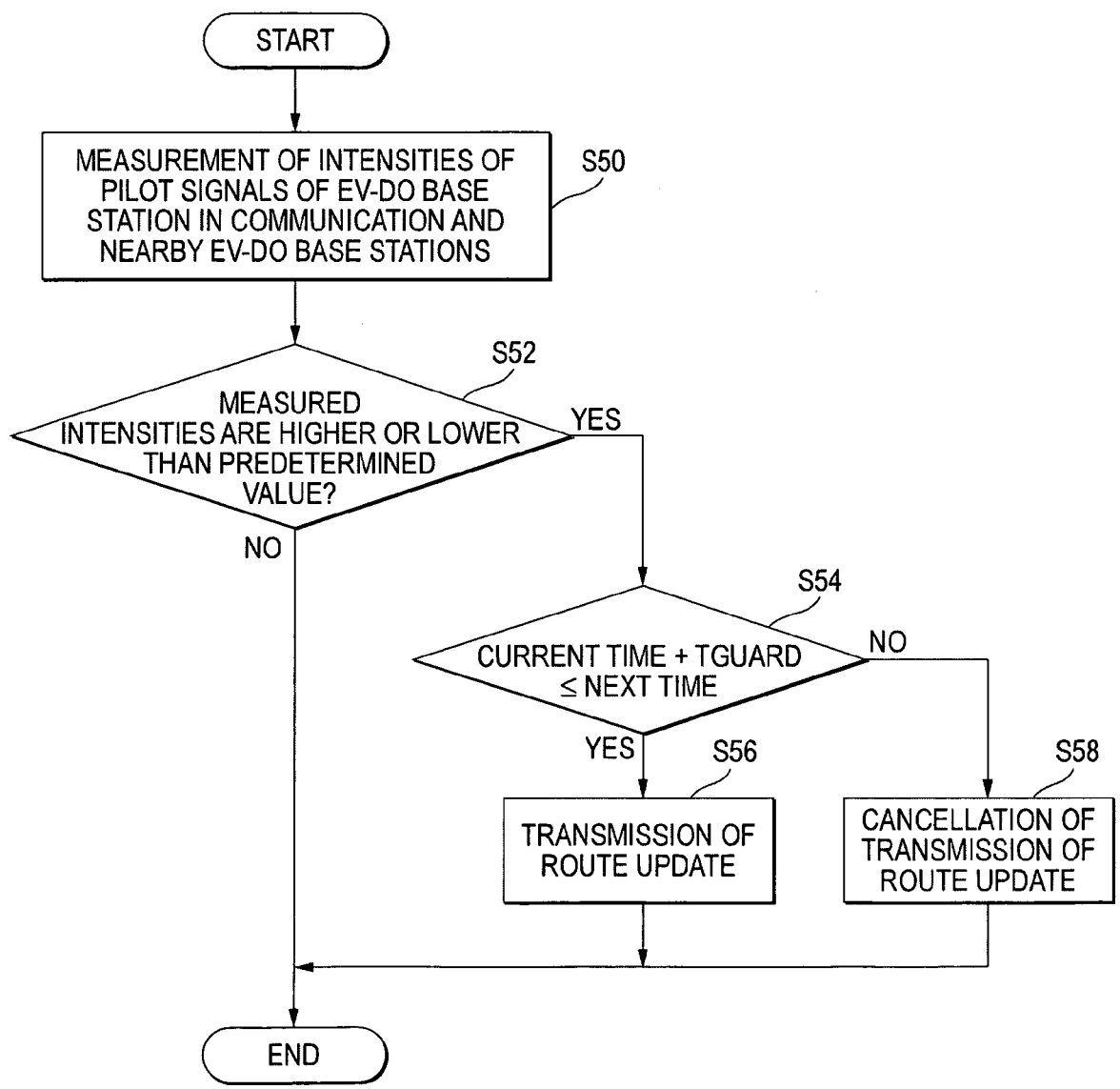
FIG. 5 is a flowchart showing hand-off processing of the wireless communication apparatus of FIG. 1.

FIG. 5 is a flowchart showing hand-off processing of the wireless communication apparatus 10. The measurement section 32 measures strength of pilot signals sent from the EV-DO base station 40 in communication through the EV-DO wireless processing section 18 and nearby base stations (S50). The decision section 34 decides to perform hand-off processing in the case where the measured strength are higher or lower than the predetermined threshold value (Y in S52). When "CurrentTime+Tguard≦NextTime" holds (Y in S54), the reporting section 36 transmits "RouteUpdate Message" (S56). On the other hand, when "CurrentTime+Tguard≦NextTime" does not hold (N in S54), the decision section 34 cancel the transmission of "RouteUpdate Message" (S58). The decision section 34 terminates the processing when the measured strength are not higher or lower than the predetermined threshold value (N in S52).

FIG. 6 is a diagram showing a sequence of hand-off processing of the wireless communication apparatus 10. The wireless communication apparatus 10 and the first EV-DO base station 40a communicate with each other under the EV-DO system (S60). The measurement section 32 measures strength of a pilot signal sent from the first EV-DO base station 40a (S62). Also, the measurement section 32 measures strength of a pilot signal sent from the second EV-DO base station 40b (S64). The decision section 34 decides to perform the hand-off from the first EV-DO base station 40a to the second EV-DO base station 40b based on the measurement results, but the reporting section 36 cancel the transmission of "RouteUpdate Message" if "CurrentTime+Tguard≦NextTime" does not hold (S66). Then, the wireless communication apparatus 10 communicates with the 1× base station 42 for monitoring an incoming call (S68). After that, the wireless communication apparatus 10 and the first EV-DO base station 40a communicate with each other under the EV-DO system (S70).

According to the embodiment, it is possible to prevent the communication line of the EV-DO system from being cut off caused by the incoming call management of the 1× system. Further, from the standpoint of a user of the wireless communication apparatus, it is possible to prevent the communication from being cut off during the good wave condition. Thus, the probability of communication disconnection reduces so that convenience enhances.

The invention has been described in conjunction with the embodiment in the foregoing. The embodiment is only by way of example, and those skilled in the art understand that the combinations of the constituents and the process steps of the processing can be modified, and that the modifications are encompassed by the scope of this invention.

What is claimed is:

1. A wireless communication apparatus comprising:
  a first communication section that communicates with base stations of a first communication system capable of hand-off;
  a second communication section that intermittently communicates with a base station of a second communication system;
  a switching section that selects either one of the first communication section or the second communication section to be operated;
  a measurement section that measures strength of signals received from base stations with the first communication section;
  a decision section that decides a candidate base station capable of hand-off based on the measured signal strength; and
  a reporting section that reports, by way of the first communication section, the decided candidate base station capable of hand-off to the base station in communication,
  wherein the reporting section cancels to report the decided candidate base station capable of hand-off based on a time difference between a timing of the intermittent communication of the control signal and a timing of the report of the candidate base station capable of hand-off.

2. The wireless communication apparatus according to claim 1, comprises:
  a first acquisition section that acquires the timing of the intermittent communication of the control signal;
  a second acquisition section that acquires the timing for the report of the candidate base station capable of hand-off, wherein the reporting section cancels to report the decided candidate base station capable of hand-off in the case where a period from the timing for the report of the candidate base station capable of hand-off to the timing of the intermittent communication of the control signal is shorter than a predetermined period.

3. The wireless communication apparatus according to claim 2,
wherein the reporting section sets the predetermined period to a time length longer than a period from a reception by the base station in communication of the report of the decided candidate base station capable of hand-off to the decision by the base station in communication to hand off to the candidate base station.

4. A hand-off control method comprising the steps of:
executing an intermittent communication of a control signal with a second communication system in preference to a communication with a base station of a first communication system; and
canceling a report of a candidate base station capable of hand-off to the base station of the first communication system, based on a time difference between a timing of the intermittent communication of the control signal and a timing of the report of the candidate base station capable of hand-off.

5. A wireless communication apparatus comprising:
a first communication section that communicates with base stations of a first communication system capable of hand-off;
a second communication section that intermittently communicates with a base station of a second communication system;
a switching section that selects either one of the first communication section and the second communication section to be operated;
a measurement section that measures strength of signals received from base stations with the first communication section;
a signal generation section that generates a signal indicating the strength of the measured signal; and
a control section that decides whether or not the first communication section transmits the signal generated by the signal generation section to the base station in communication based on a time difference between a current time and a nearest time on which the second communication section communicates with the base station of the second communication system.

6. The wireless communication apparatus according to claim 5,
wherein the control section permits to transmit the signal generated by the signal generation section if a time acquired by adding a predetermined period to the current time is on or before the nearest time.

7. The wireless communication apparatus according to claim 6,
wherein the predetermined period is longer than or equal to a period while the base station in communication receives the signal generated by the signal generation section and then decides to perform the hand-off.

8. A hand-off control method of a wireless communication apparatus comprising a first communication section that communicates with base stations of a first communication system capable of hand-off; and a second communication section that intermittently communicates with a base station of a second communication system, comprising the steps of:
measuring strength of signals received from a base station in communication with the first communication section and base stations other than the base station in communication;
generating a signal indicating the strength of the measured signal; and
deciding whether or not the first communication section transmits the signal generated by the signal generation section to the base station in communication based on a time difference between a current time and a nearest time on which the second communication section communicates with the base station of the second communication system.

* * * * *